(12) United States Patent
Sturman

(10) Patent No.: US 11,208,743 B2
(45) Date of Patent: Dec. 28, 2021

(54) CONNECTING A FIRST FABRIC EDGE WITH A SECOND FABRIC EDGE

(71) Applicant: Wearable Technology Limited, Leicester (GB)

(72) Inventor: Richard Sturman, Kirkby-in-Ashfield (GB)

(73) Assignee: Wearable Technology Limited, Leicester (GB)

( * ) Notice: Subject to any disclaimer, the term of this patent is extended or adjusted under 35 U.S.C. 154(b) by 257 days.

(21) Appl. No.: 16/371,625

(22) Filed: Apr. 1, 2019

(65) Prior Publication Data

US 2020/0040489 A1 Feb. 6, 2020

(30) Foreign Application Priority Data

Jul. 31, 2018 (GB) ..................... 1812542

(51) Int. Cl.
| | | |
|---|---|---|
| *B32B 37/12* | (2006.01) | |
| *D03D 11/02* | (2006.01) | |
| *A41D 27/24* | (2006.01) | |
| *B29C 65/48* | (2006.01) | |
| *D21F 7/10* | (2006.01) | |
| *A41D 13/01* | (2006.01) | |
| *A41D 27/20* | (2006.01) | |
| *A41D 27/08* | (2006.01) | |

(52) U.S. Cl.
CPC .............. *D03D 11/02* (2013.01); *A41D 13/01* (2013.01); *A41D 27/201* (2013.01); *A41D 27/24* (2013.01); *B29C 65/48* (2013.01); *B32B 37/12* (2013.01); *D21F 7/10* (2013.01); *A41D 27/085* (2013.01); *A41D 2300/32* (2013.01); *A41D 2300/326* (2013.01)

(58) Field of Classification Search
CPC ........ D03D 11/02; B32B 37/12; A41D 13/01; A41D 27/201; A41D 27/24; A41D 2300/32; A41D 2300/326; A41D 27/085; B29C 65/48; D21F 7/10
See application file for complete search history.

(56) References Cited

U.S. PATENT DOCUMENTS 5,128,843 A * 7/1992 Guritz .................. A41D 27/085
362/103
6,267,482 B1 * 7/2001 Miller .................... A41D 13/01
362/103

(Continued)

OTHER PUBLICATIONS

Corresponding Great Britain Patent Application No. GB1812542.7, Great Britain Search Report dated Jan. 17, 2019.

*Primary Examiner* — Cynthia L Schaller
(74) *Attorney, Agent, or Firm* — Cooper Legal Group LLC

(57) ABSTRACT

A seam connecting fabric edges is formed by surrounding a first fabric edge with a first plush material strip suitable for the attachment of a hooked material. The first plush material strip defines a first front surface and a first rear surface. A second fabric edge is surrounded with a second plush material strip having a second front surface and a second rear surface. A single strip of a hooked material is deployed behind the first rear surface and the second rear surface. Then, with the first surrounded edge substantially in contact with the second surrounded edge, a force is applied to engage hooks of the single strip of hooked material with said first rear surface and said second rear surface.

13 Claims, 18 Drawing Sheets

(56) References Cited

U.S. PATENT DOCUMENTS

| | | | |
|---|---|---|---|
| 7,131,703 B1 * | 11/2006 | Sheridan | B60R 22/105 297/465 |
| 10,767,850 B2 * | 9/2020 | Sturman | F21V 33/0008 |
| 2014/0013495 A1 | 1/2014 | Aquino | |
| 2016/0366957 A1 | 12/2016 | Chen | |

* cited by examiner

CONNECTING A FIRST FABRIC EDGE WITH A SECOND FABRIC EDGE

CROSS REFERENCE TO RELATED APPLICATIONS

This application claims priority from United Kingdom Patent Application number 1812542.7, filed on Jul. 31, 2018, the whole contents of which are incorporated herein by reference.

BACKGROUND OF THE INVENTION

The present invention relates to a method of forming a seam connecting a first fabric edge with a second fabric edge.

The present invention also relates to an apparatus for forming a seam.

It is known to use hook and loop tape closures, of the type sold under the trademark "Velcro"® However, on some products, the grabbing nature of the hook component results in the closure system fixing itself to areas of a textile product that cause the product to fasten incorrectly or cause permanent damage to fibres not designed to withstand such a fixing. Furthermore, problems can also arise due to the harshness of the finished closure against the body of the wearer.

BRIEF SUMMARY OF THE INVENTION

According to a first aspect of the present invention, there is provided a method of forming a seam connecting fabric edges, comprising the steps of: surrounding a first fabric edge with a first plush material strip suitable for the attachment of a hooked material, wherein said first plush material strip defines a first front surface and a first rear surface; surrounding a second fabric edge with a second plush material strip, wherein said second plush material strip defines a second front surface and a second rear surface; deploying a single strip of a hooked material behind said first rear surface and said second rear surface; and with said first surrounded edge substantially in contact with said second surrounded edge, applying force to engage hooks of said single strip of hooked material with said first rear surface and said second rear surface.

In an embodiment, the first fabric edge and said second fabric edge are formed by a cutting a fabric. Furthermore, the cutting of a fabric may be performed upon an inner layer of an item of clothing to reveal an inner surface of an outer layer of said item of clothing.

According to a second aspect of the invention, there is provided an apparatus for forming a seam, comprising: a first strip of a plush material and a second strip of a plush material; and a single strip of a hooked material, wherein: the first strip is configured to surround a first fabric edge; the second strip is configured to surround a second fabric edge, in which said second fabric edge is adjacent to said first fabric edge; and the single strip is configured to be deployed beneath the rear faces of said first strip and said second strip.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art.

Components and processes distinguished by ordinal phrases such as "first" and "second" do not necessarily define an order or ranking of any sort.

DETAILED DESCRIPTION OF EMBODIMENTS OF THE INVENTION

FIG. 1

Figure 1:
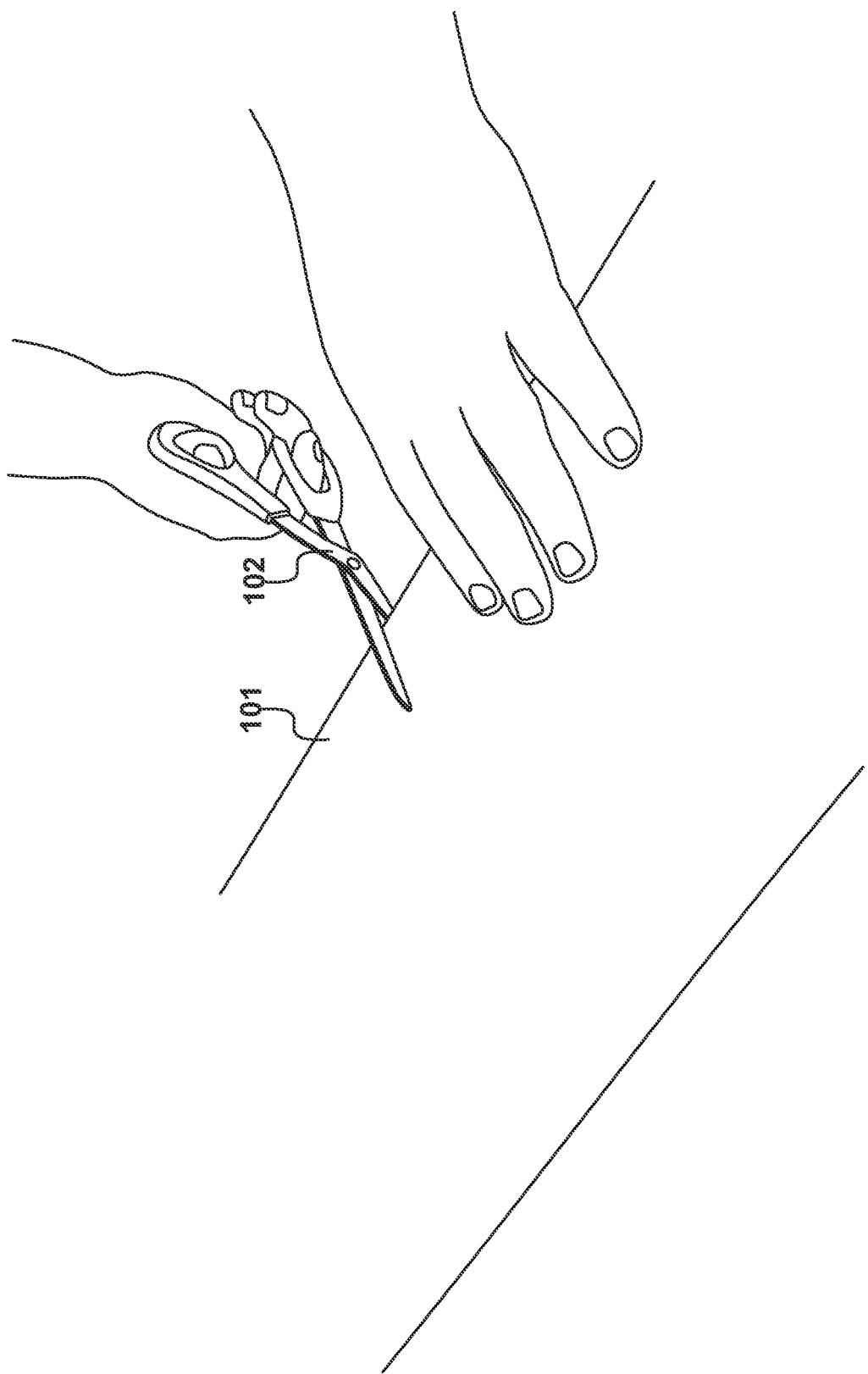
FIG. 1 shows an inner fabric of a garment being cut.
Figure 2:
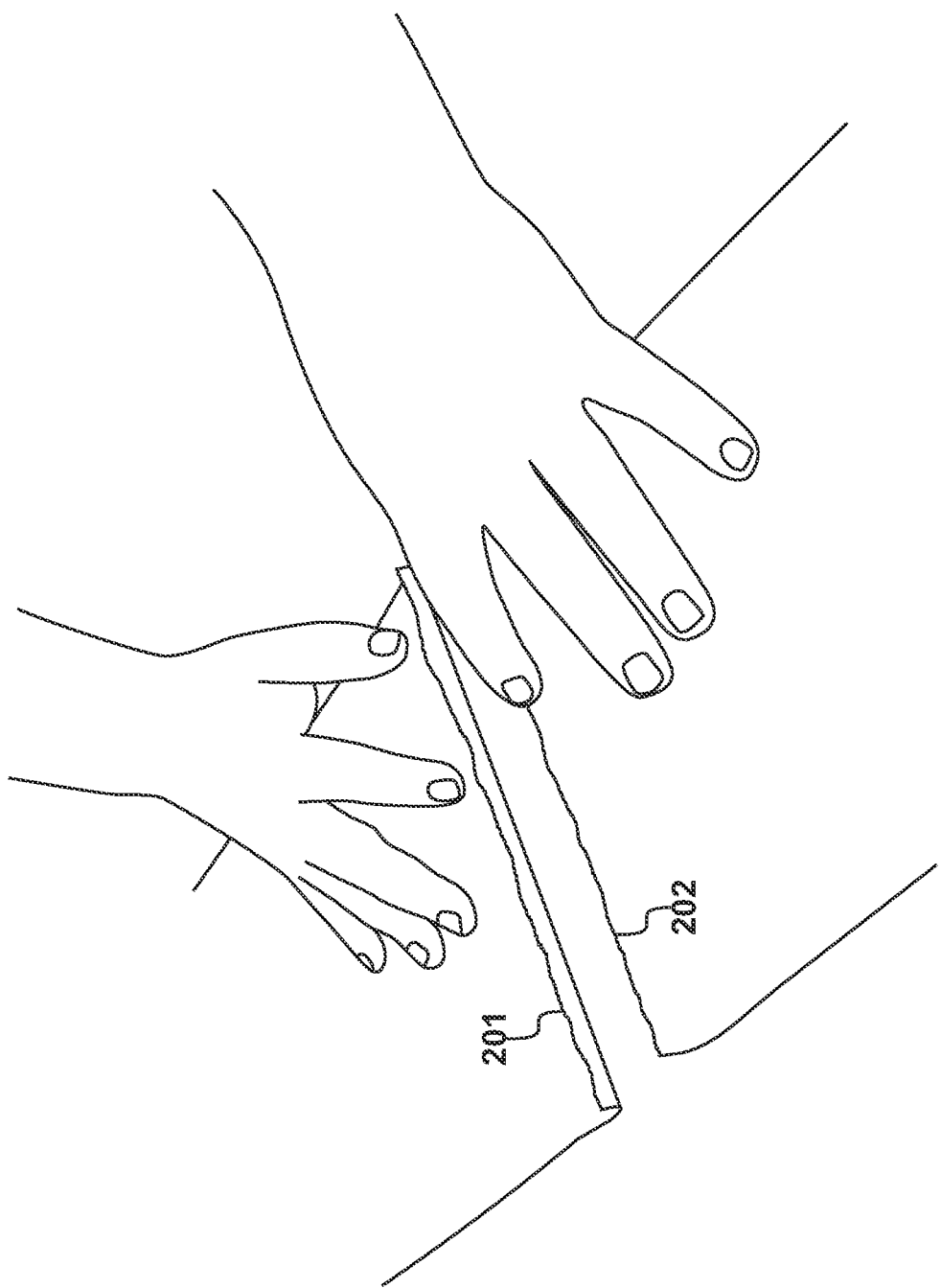
FIG. 2 shows fabric edges after a cut has been completed.

A fabric is shown in FIG. 1 that, in an embodiment, represents an inner fabric layer of a garment which is then surrounded by an outer fabric layer. The seam is established by surrounding a first fabric edge with a first plush material strip suitable for attachment to a hooked material, wherein the first plush material strip defines a first front surface and a first rear surface. A second fabric edge is also surrounded with a second plush material strip, wherein the second plush material strip defines a second front surface and the second rear surface. A single strip of a hooked material is then deployed behind the first rear surface and the second rear surface. Thereafter, with the first surrounding edge substantially in contact with the second surrounded edge, a force is applied to engage hooks of the single strip of hooked material with the first rear surface and the second rear surface. In this way, it is possible to create a robust but re-accessible seam while retaining a substantially smooth outer finish. Furthermore, it is possible for components, such as electronic components, to be retained behind the seam; accommodated by the additional material and protected by this additional material.

An example of a fabric is illustrated in FIG. 1. The fabric may be deployed for many purposes but, in an embodiment, it represents an inner fabric of a multilayer item of clothing.

In particular, the item of clothing may be protective clothing with an outer layer of fluorescent material and an inner layer of a mesh material.

It is possible to deploy the seam relatively easily either while an item of clothing is being constructed or, after the item of clothing has been constructed, as a retro fit.

Thus, as illustrated in FIG. 1, the fabric material 101 may be cut using scissors 102 or an alternative cutting device.

FIG. 2

Having cut the fabric material 101, as described with reference to FIG. 1. The fabric now presents a first fabric edge 201 and a second fabric edge 202.

FIG. 3

Figure 3:
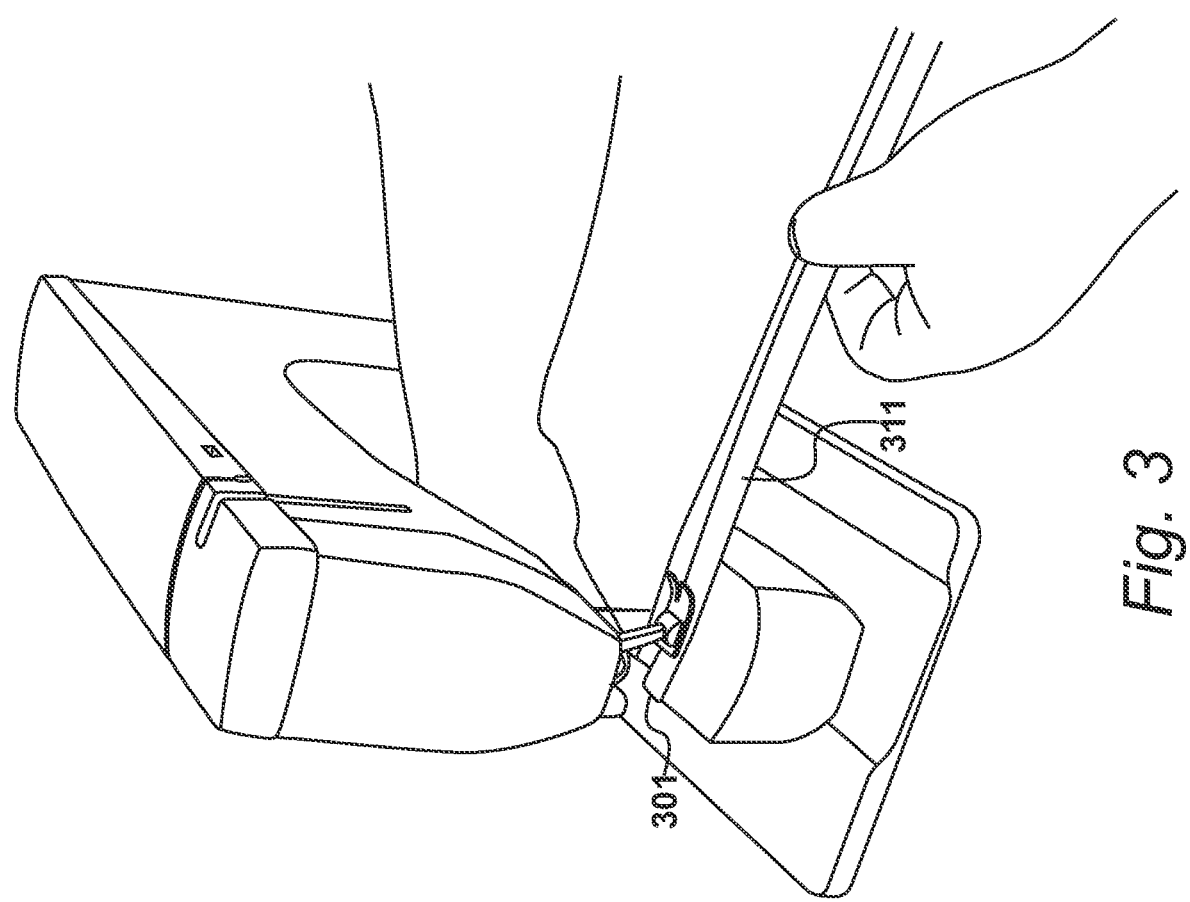
FIG. 3 shows the sewing of a first plush material strip around a first fabric edge.

The first fabric edge is surrounded with a first plush material strip that is suitable for the attachment of a hooked material. The first plush material strip defines a first front surface 311 shown in FIG. 3 and a first rear surface, obscured in FIG. 3. Thus, with the first plush material completely surrounding the first fabric edge, the three layers are sewn together, as illustrated in FIG. 3.

A similar procedure is performed for the second fabric edge 202. Thus, a second plush material strip surrounds a second fabric edge, wherein the second plush material strip defines a second front surface and a second rear surface.

FIG. 4

Figure 4:
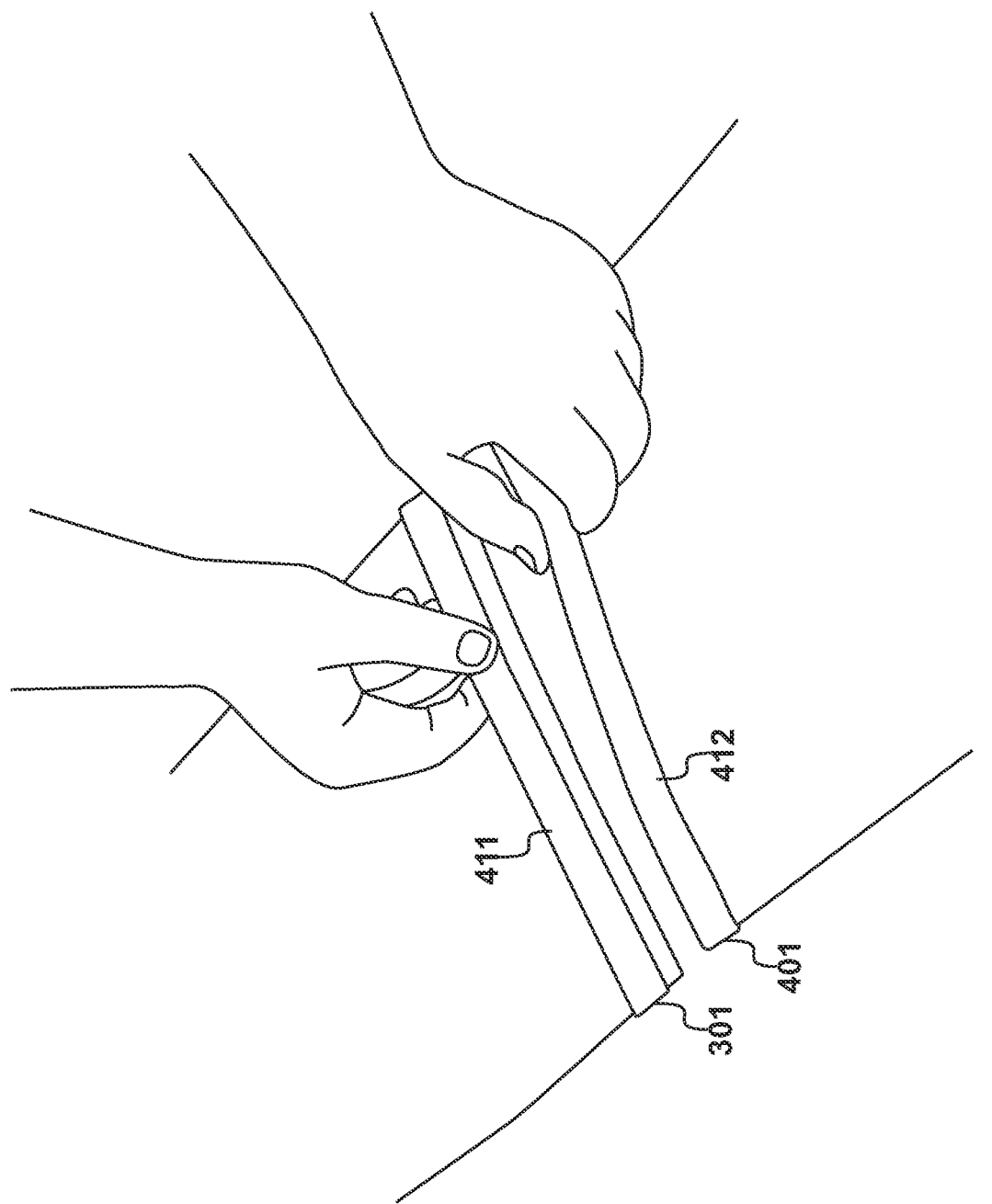
FIG. 4 shows the bringing together of two edges surrounded by plush material.

Having sewn the first plush material strip, to surround the first fabric edge, and sewn the second plush material strip to surround the second fabric edge, as described with reference to FIG. 3, the two edges are brought together, as illustrated in FIG. 4. Thus, at this stage, the first plush material strip 301 is brought into close proximity with a second plush material strip 401. In FIG. 4, the strips have been folded upwards, such that a first rear surface 411 of the first plush material strip 301 is shown, along with a second front surface 412 of the second plush material strip.

FIG. 5

Figure 5:
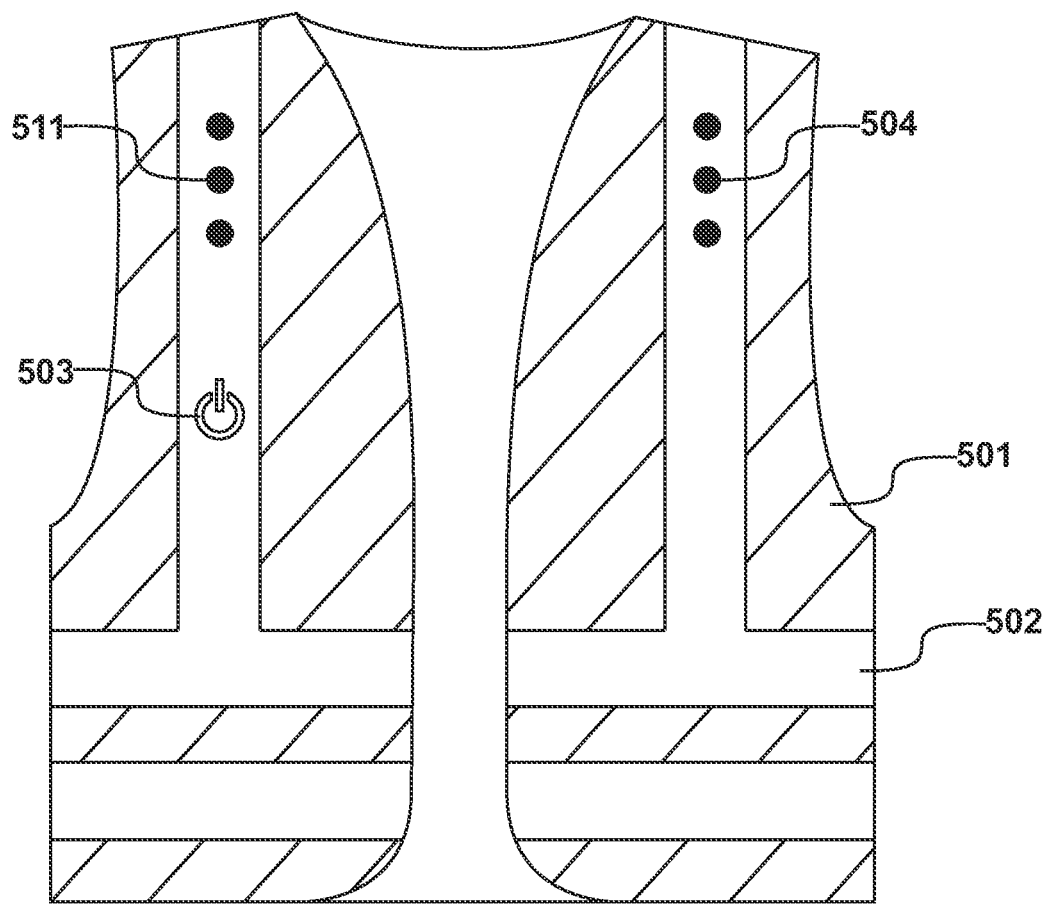
FIG. 5 shows the front of an item of clothing.

An example of an item of clothing is shown in FIG. 5. In this example, the item of clothing is a vest but the invention may be deployed in other types of clothing, such as harnesses and jackets etc.

In this example, the item of clothing is constructed from a fluorescent material 501. In addition, reflective tape 502 has been located over the fluorescent material, thereby increasing the visibility of the vest during both daylight conditions and night time conditions. This provides an external layer of material for the item of clothing, which also include an internal mesh layer.

In this embodiment, a light-emitting device loom is restrained substantially behind the reflective tape 502 and a control unit is supported within an internal pocket for receiving a loom connector. The control unit may be activated without it being removed from this pocket by manual pressure applied at an indicator 503. A fourth device strip supports a fourth device group 504 and a first device strip supports a first device group 511.

FIG. 6

Figure 6:
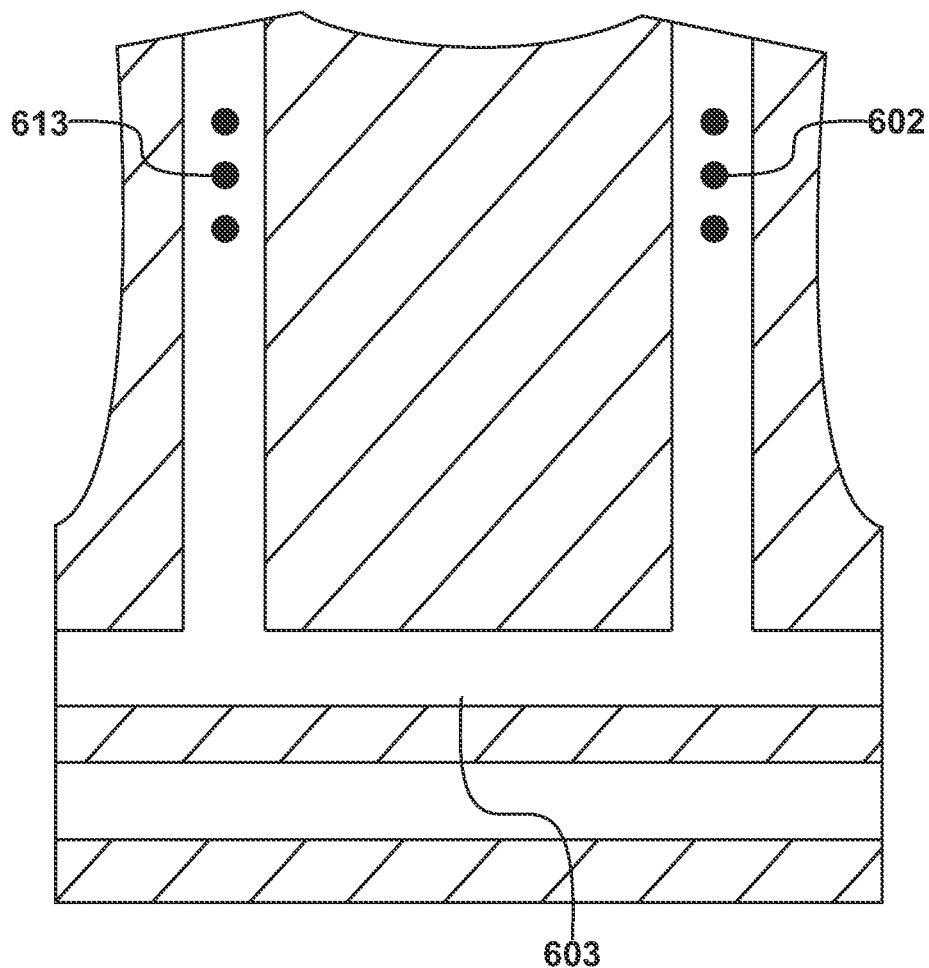
FIG. 6 shows the rear of the item of clothing identified in FIG. 5.

A rear view of the vest described with reference to FIG. 5 is illustrated in FIG. 6. A second set of light-emitting devices 602 are supported by a third device strip. The loom then extends beneath a horizontal portion 603 to connect to a third device group 613 supported by a third device strip.

FIG. 7

In an embodiment, it is desirable for the device strips to be protected as much as possible and for the light-emitting devices to be protected, while at the same time allowing light to be emitted. An embodiment therefore provides a solution by retaining the bulk of the device strips behind the reflective tape, while providing transparent windows for the emission of light from these devices. In an embodiment, a clear flexible plastics material (such as poly vinyl chloride) is used.

Figure 7:
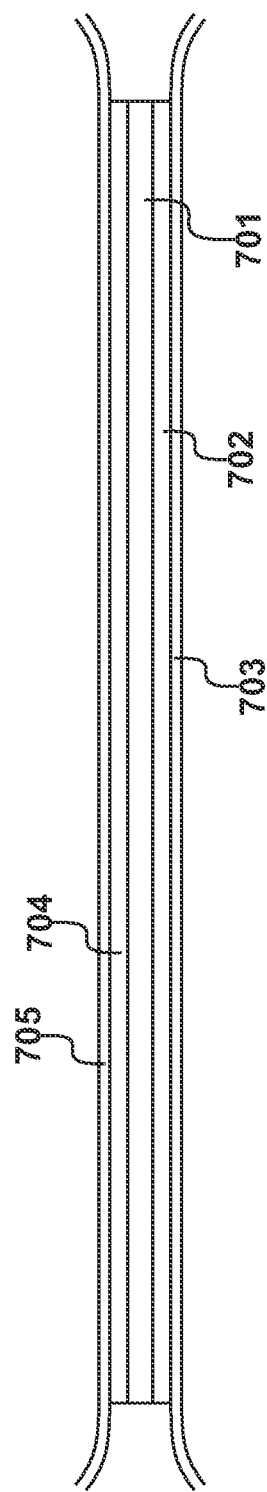
FIG. 7 illustrates a composite adhesive film.

The clear flexible material is secured by applying an adhesive film to an inside surface of a clothing fabric. An example of a suitable film of this type is illustrated in FIG. 7. The adhesive film is a composite material that includes a mid-positioned barrier film 701.

A lower surface of the barrier film 701 contacts with a lower adhesive layer 702, which is in turn protected by a lower protective film 703, possibly implemented as a layer of grease-proofed paper. Similarly, an upper surface of the barrier film 701 is in contact with an upper adhesive layer 704, again protected by an upper protective film 705.

To achieve adhesion, the lower protective film 703 is removed and the materials brought into contact. Adhesion is then achieved by the application of pressure and heat, resulting in the creation of a seal that is mechanically strong and watertight.

FIG. 8

Figure 8:
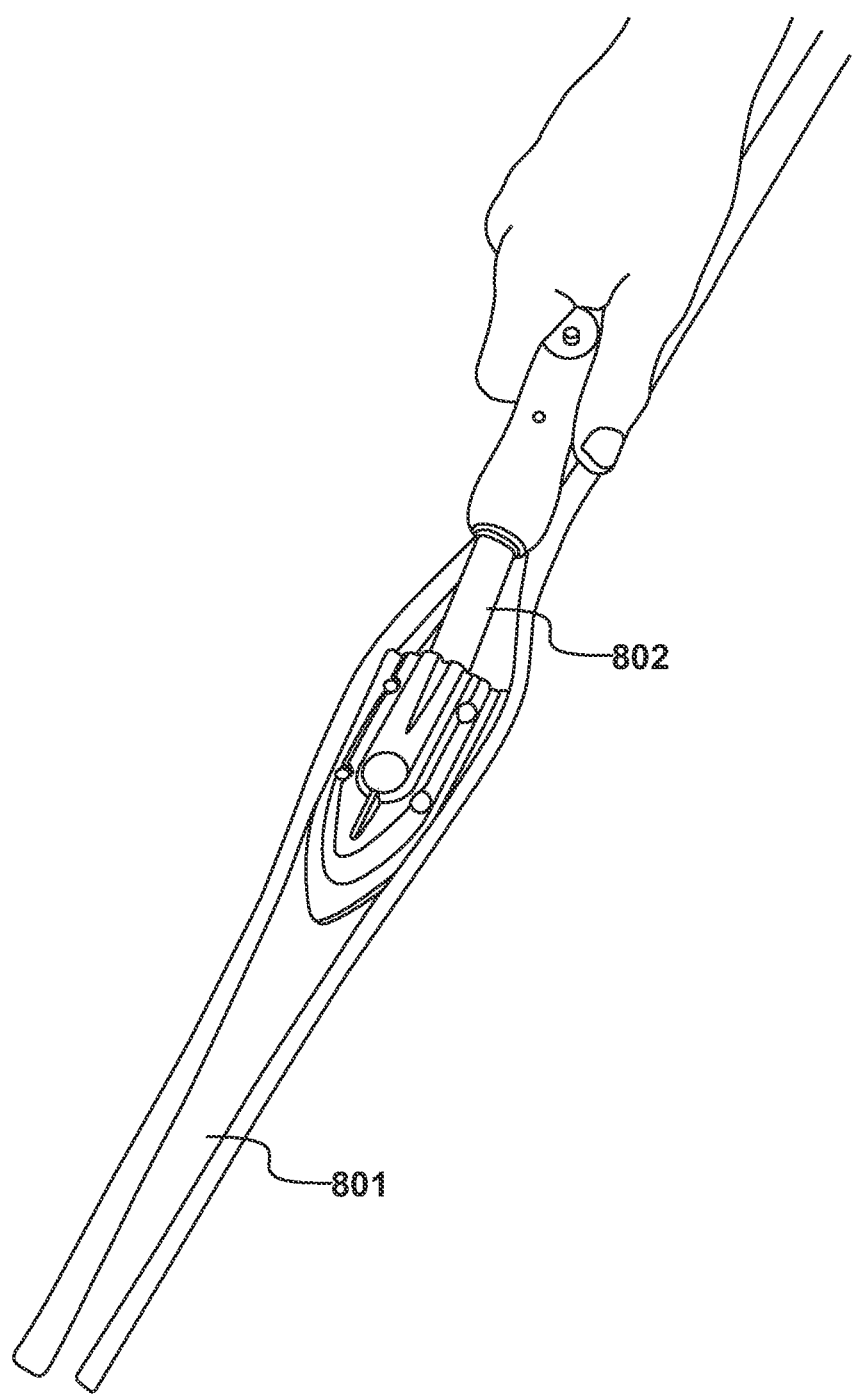
FIG. 8 illustrates the application of the adhesive film, identified in FIG. 7, to an inside surface of a clothing fabric.

An inside surface 801 of an outer layer of a clothing fabric is illustrated in FIG. 8. The adhesive film, described with reference to FIG. 7, is located over a portion of this inside surface after the first protective film 703 has been removed. The adhesive film is then retained in place by the application of heat and pressure, as illustrated by the application of iron 802.

FIG. 9

After the barrier film 701 has been secured to the inside surface of the clothing fabric, a template 901 is located over the second protective film 705. The template 901 includes a first hole 911, a second hole 912 and a third hole 913. The spacing between these holes 911 to 913 is compatible with the spacing between individual devices within a device group. Thus, the holes 911 to 913 define the position of windows for the light-emitting devices.

FIG. 10

Figure 9:
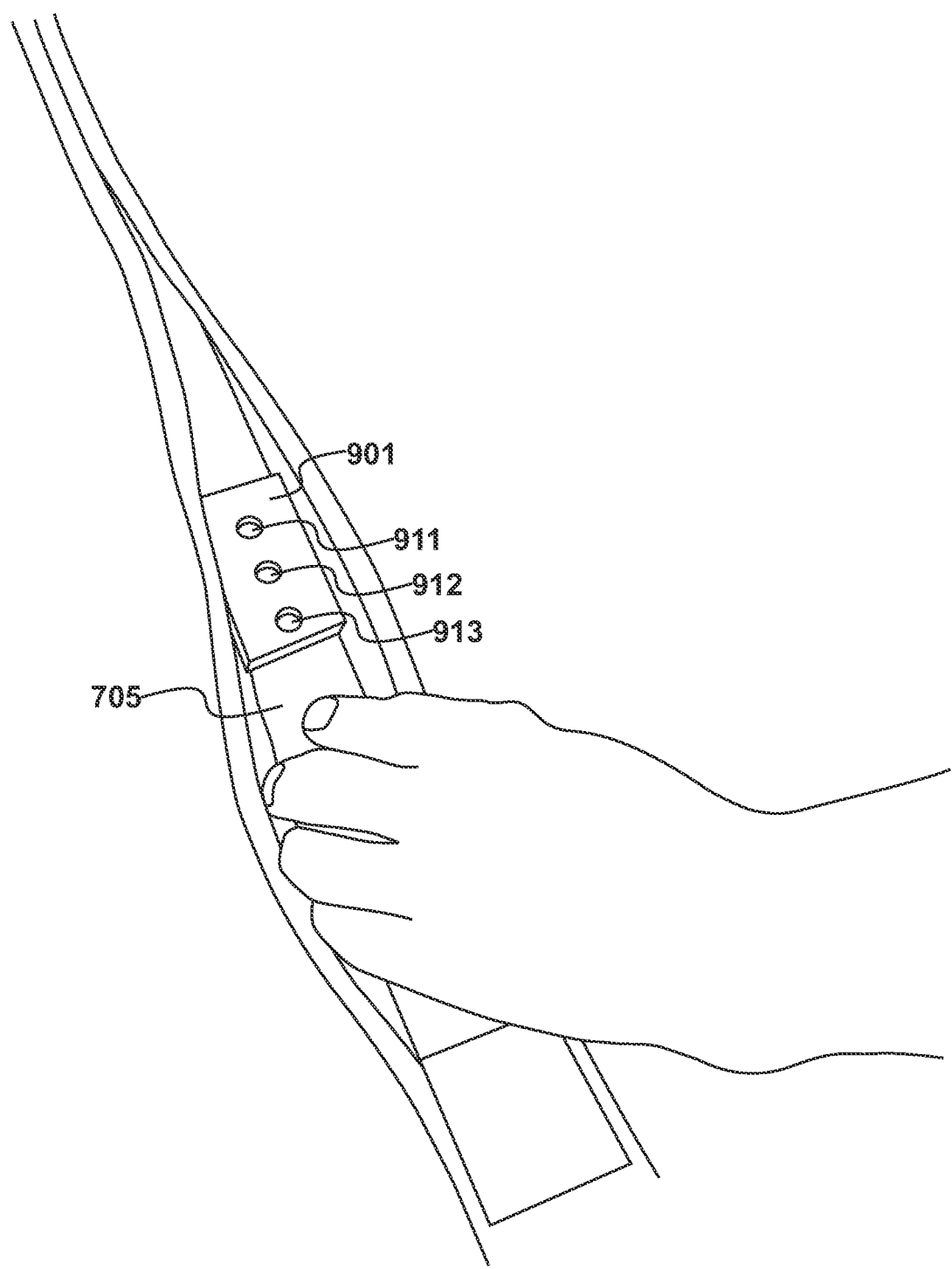
FIG. 9 illustrates the application of a template to assist with the drilling of holes.
Figure 10:
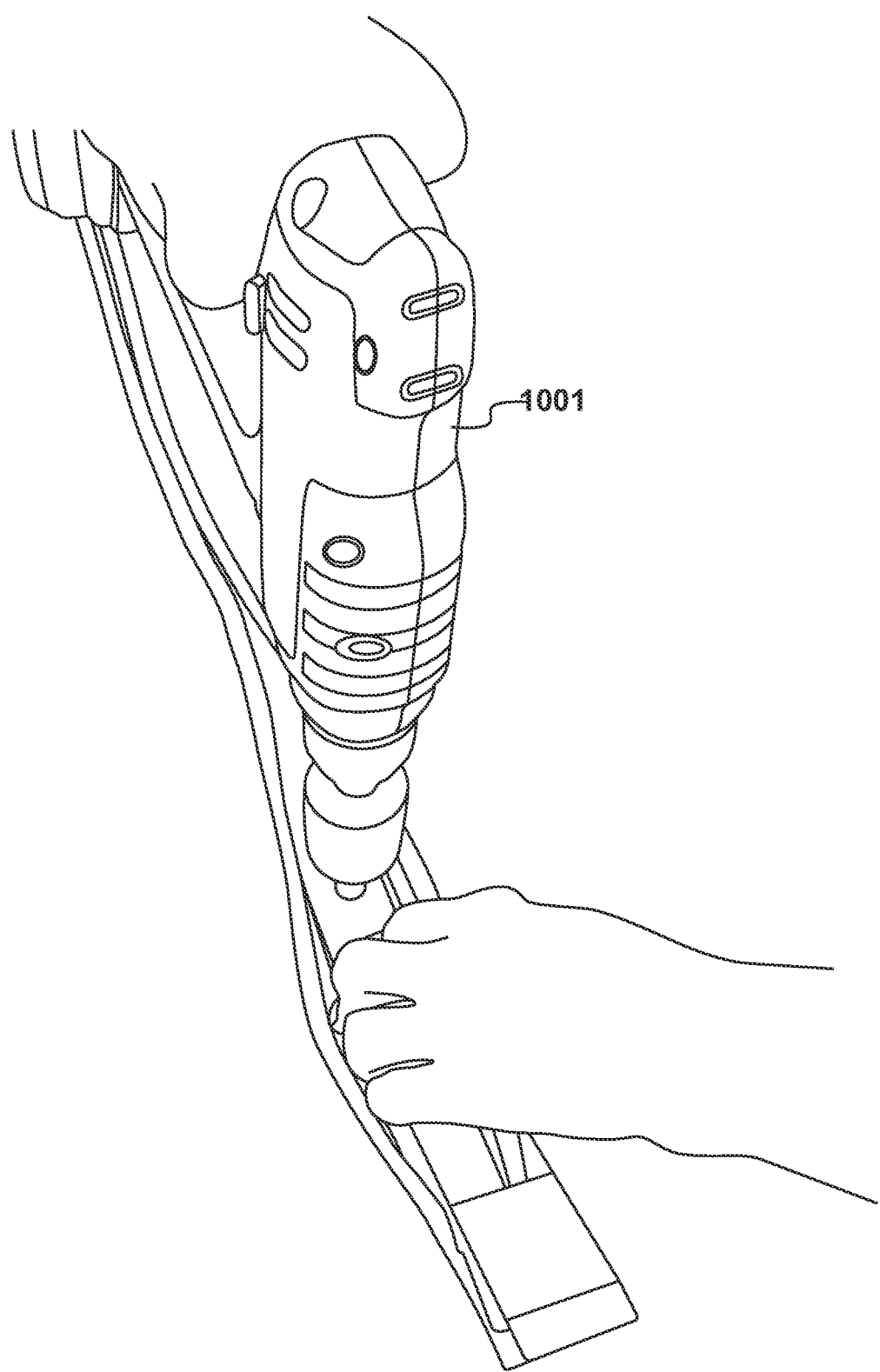
FIG. 10 shows the deployment of a power drill to perform a twist cutting operation.
Figure 11:
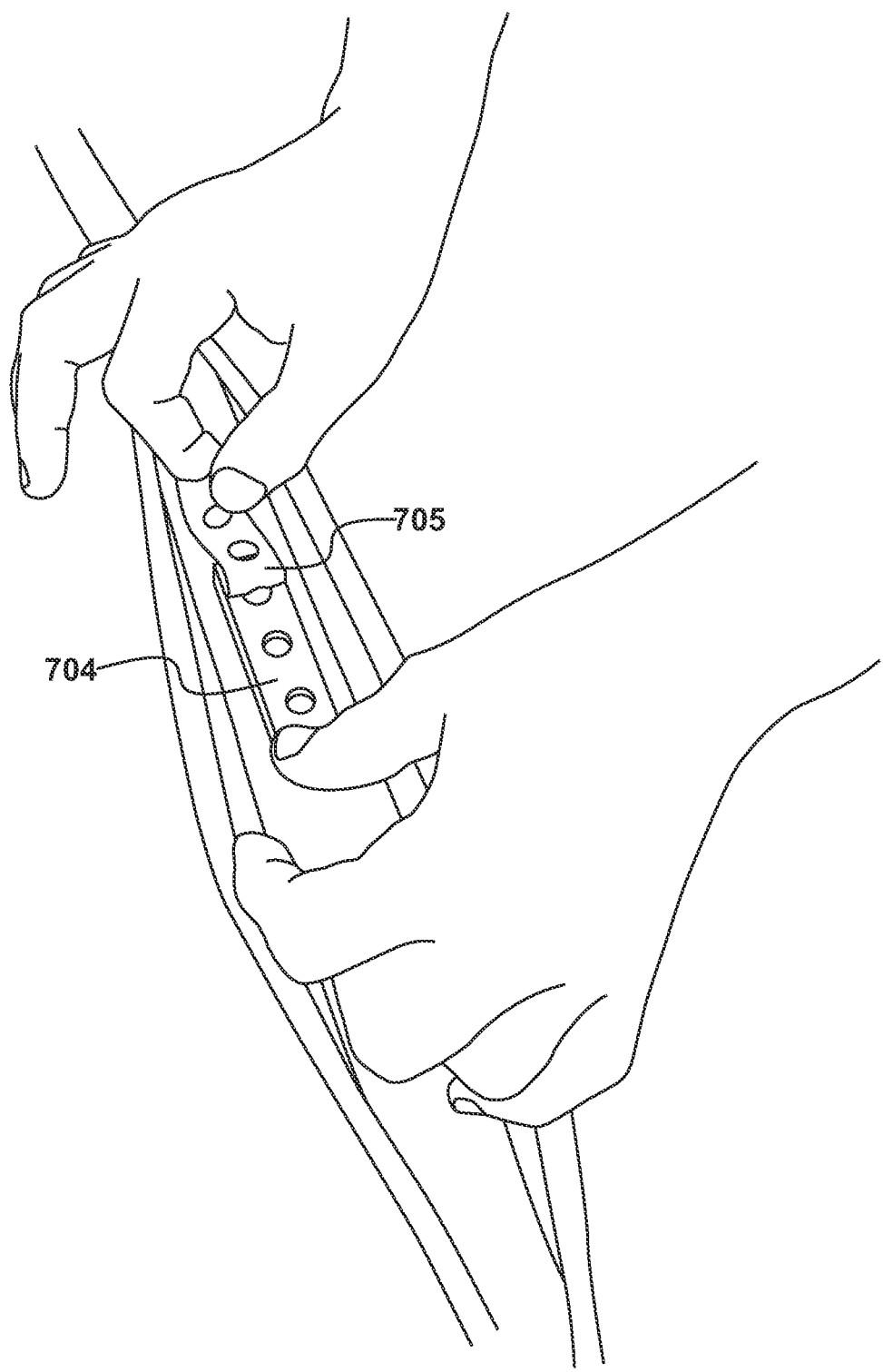
FIG. 11 shows the removal of a protective film.

After the application of the template 901, as described with reference to FIG. 9, a power drill 1001 is deployed to perform a twist cutting operation at the location of each hole 911 to 913. A twist cutting operation is used to create clean cut holes through the second protective film 705, the upper adhesive layer 704, the barrier film 701, the adhered fluorescent material 501 and the reflective tape 502.

FIG. 11

Figure 12:
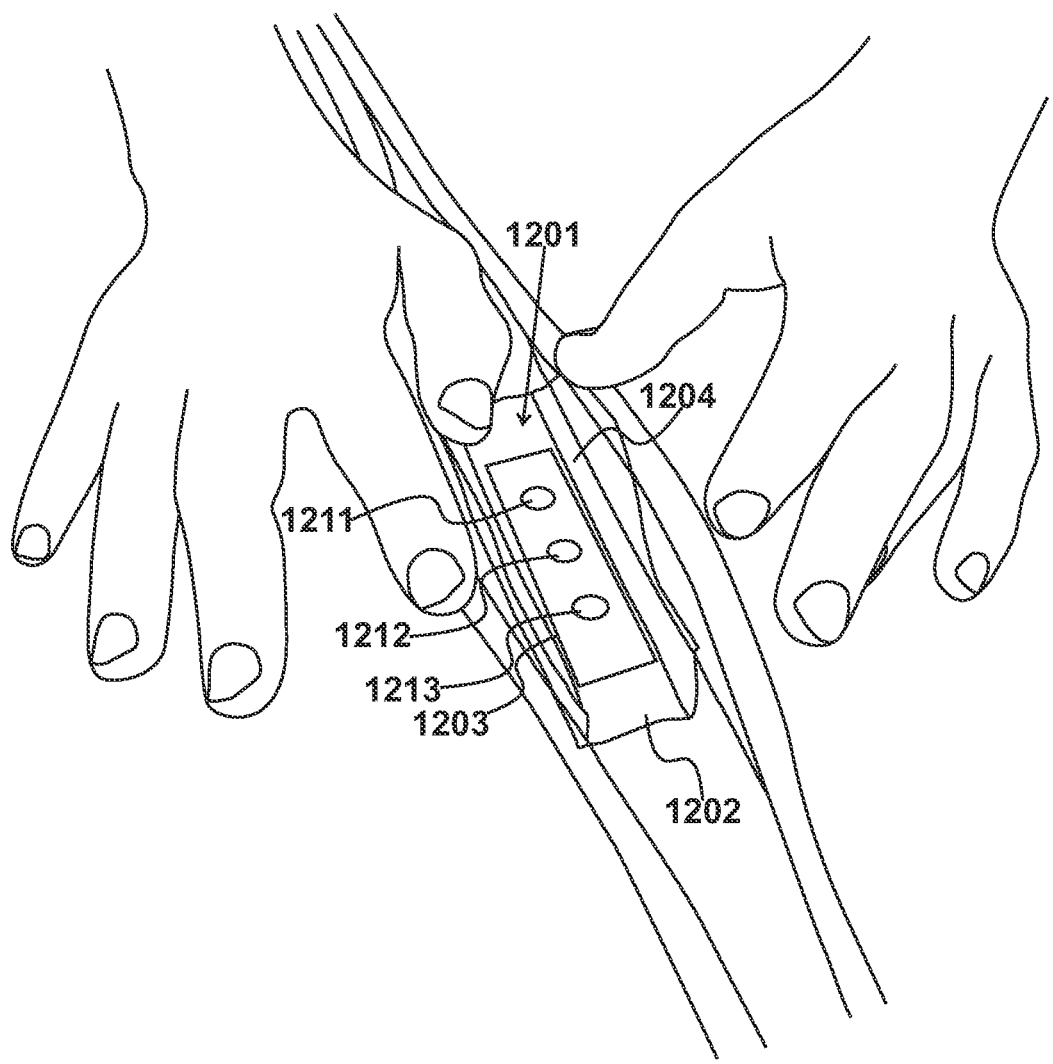
FIG. 12 shows the application of a clear plastics material over the holes.
Figure 13:
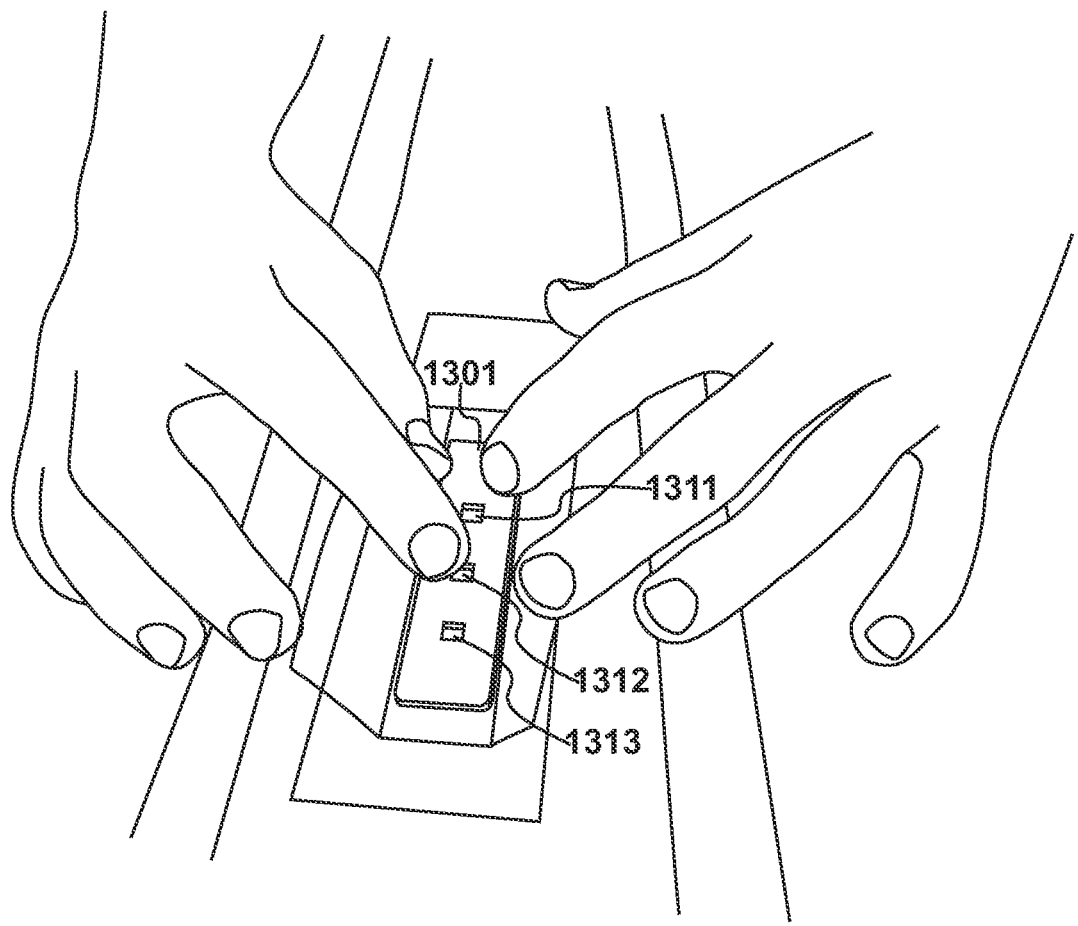
FIG. 13 shows the application of a gasket.

After twist cutting the three holes through the adhesive film, the second protective film 705 is removed, such that the adhesive film now presents the unprotected upper adhesive layer 704 for the reception of a clear plastics material, as described with reference to FIG. 12.

FIG. 12

A clear plastics material 1201 includes a central portion 1202, a first flap 1203 and a second flap 1204.

The central portion 1202 of the clear plastics material 1201 is positioned over the first hole 911, the second hole 912 and the third hole 913 to define respective windows, comprising a first window 1211, a second window 1212 and a third window 1213.

FIG. 13

In an embodiment, a gasket 1301, possibly constructed from a foam-based material, is secured by the upper adhesive layer 704. The gasket 1301 includes a first gasket hole 1311, a second gasket hole 1312 and a third gasket hole 1313. Gasket holes 1311 to 1313 line up with respective windows 1211 to 1213.

FIG. 14

A device strip 1401 is located over the gasket 1301. The first gasket hole 1311, the second gasket hole 1312 and the third gasket hole 1313 provide an interference fit for the first light-emitting device, the second light-emitting device and the third light-emitting device respectively, such as may be present in the first device group 511, the second set of light-emitting devices 602, the third device group 613 or the fourth device group 504.

Thus, the light-emitting devices are retained within respective gasket holes 1311 to 1313 by an application of pressure in the direction of a second arrow 1402.

FIG. 15

Figure 14:
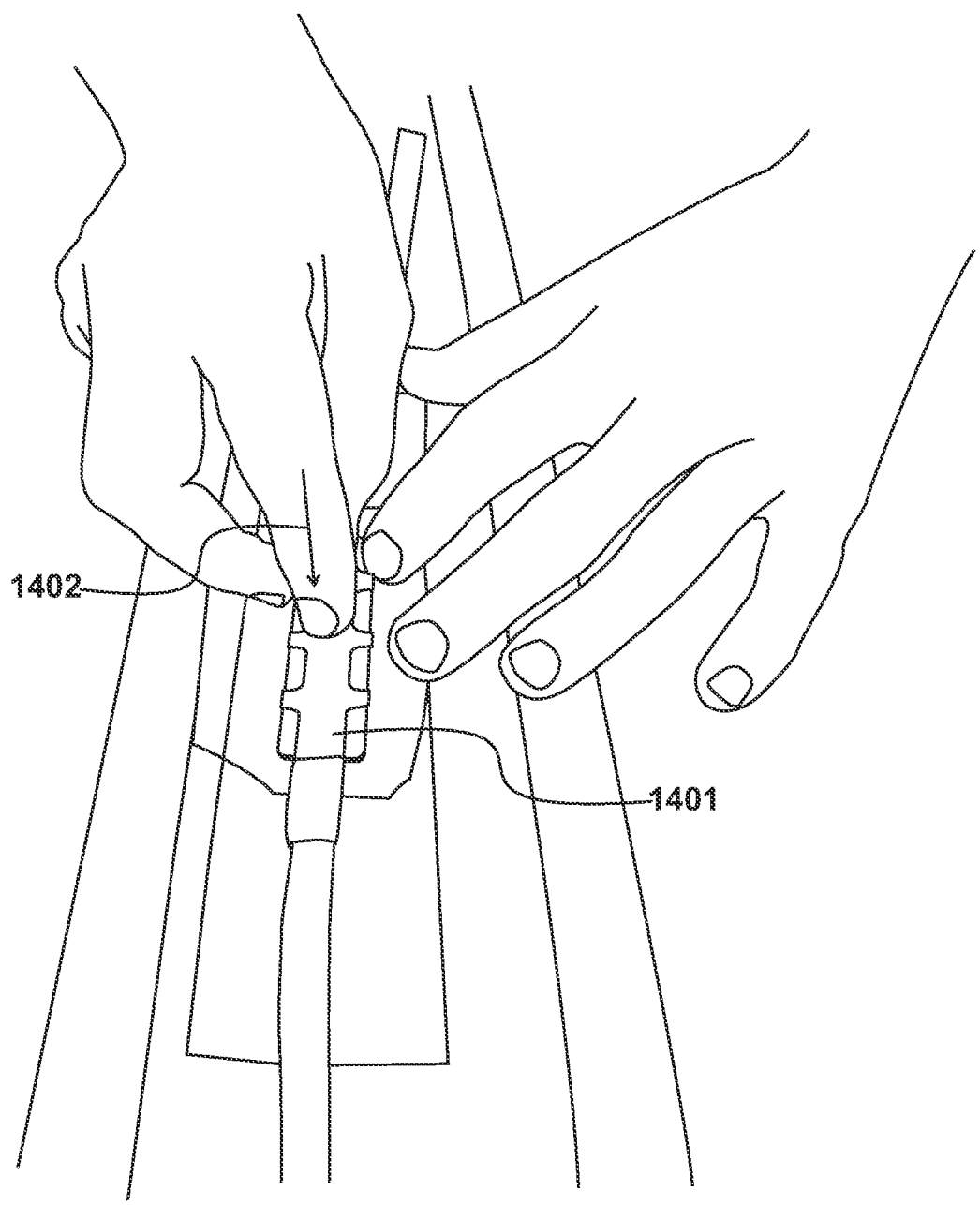
FIG. 14 shows the application of an LED strip over the gasket identified in FIG. 13.
Figure 15:
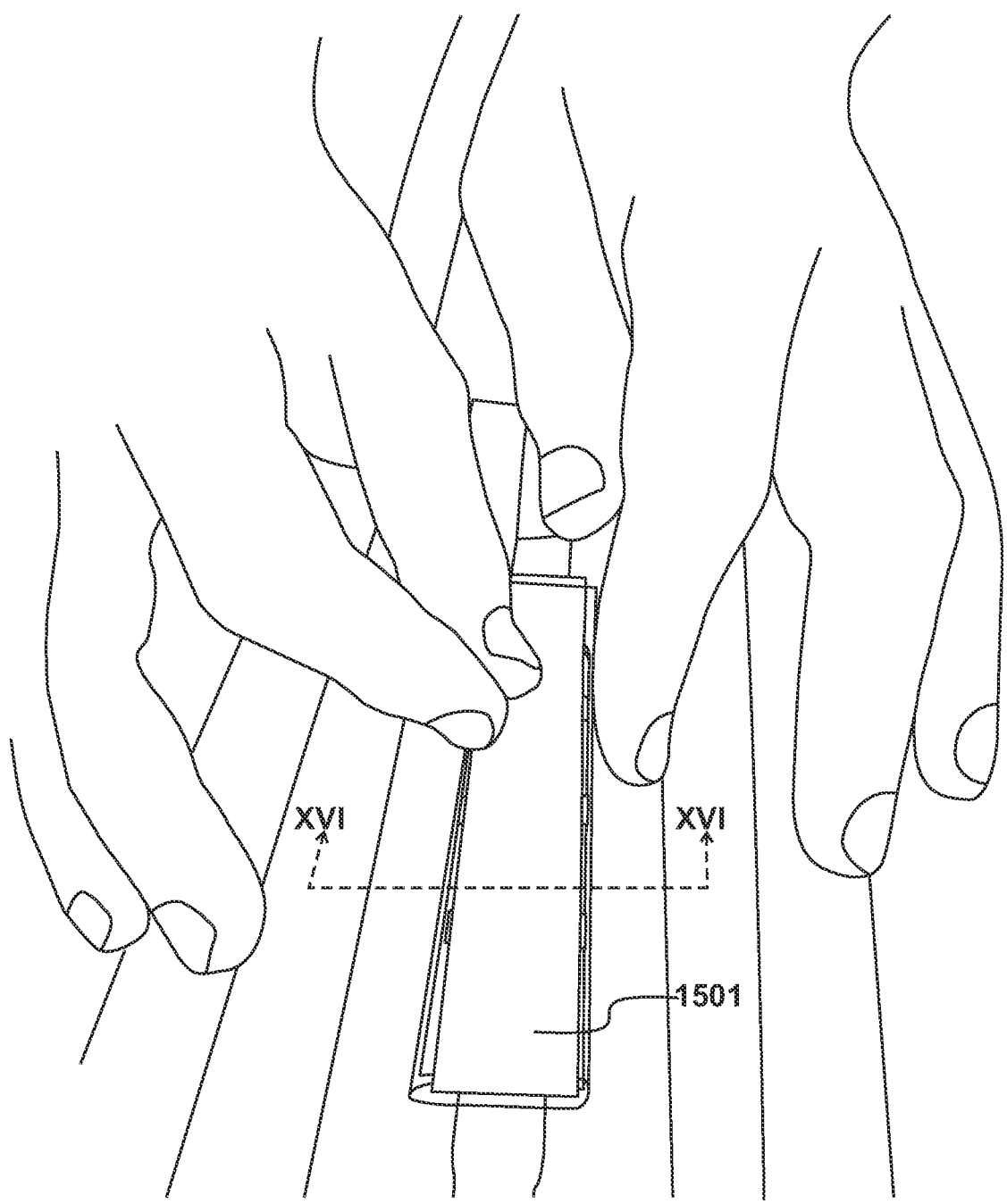
FIG. 15 shows the application of a protective layer and the folding of flaps.

After the light-emitting devices have been received within the holes defined within the gasket 1301, as described with reference to FIG. 14, in an embodiment, a protective layer 1501 is deployed over the LED strip 1401.

In this embodiment, the first flap 1203 is folded over a rear surface of a substrate of a flexible printed circuit board which, to place the first flap 1203 in contact with the protective layer 1401. Thereafter, the second flap 1204 is further folded over the folded first flap 1203 and the whole assembly is made secure and watertight by attaching the further folded second flap to the folded first flap.

FIG. 16

In this embodiment, the enclosed device strip may be considered as an example of a component held within the protected channel. The channel could be used for protecting many other types of components or the seam described herein could be used without any components being retained, either as an aesthetic feature or as a mechanism for allowing access to the internal surface of the external material layer. Many other applications may exist for the seam, which may not necessarily involve deployment within an item of clothing.

To secure the seam, a single strip of a hooked material 1601 is deployed behind the first rear surface 411 and a second rear surface 1602 of the second plush material strip 401. Many types of hooking systems are available for providing the functionality of the hooked material 1601. In an embodiment, the hooked material 1601 is provided by Stretch Line of the United Kingdom (website stretchline.com) under the commercial designation low profile plastic hook, twenty millimetres black.

FIG. 17

Figure 16:
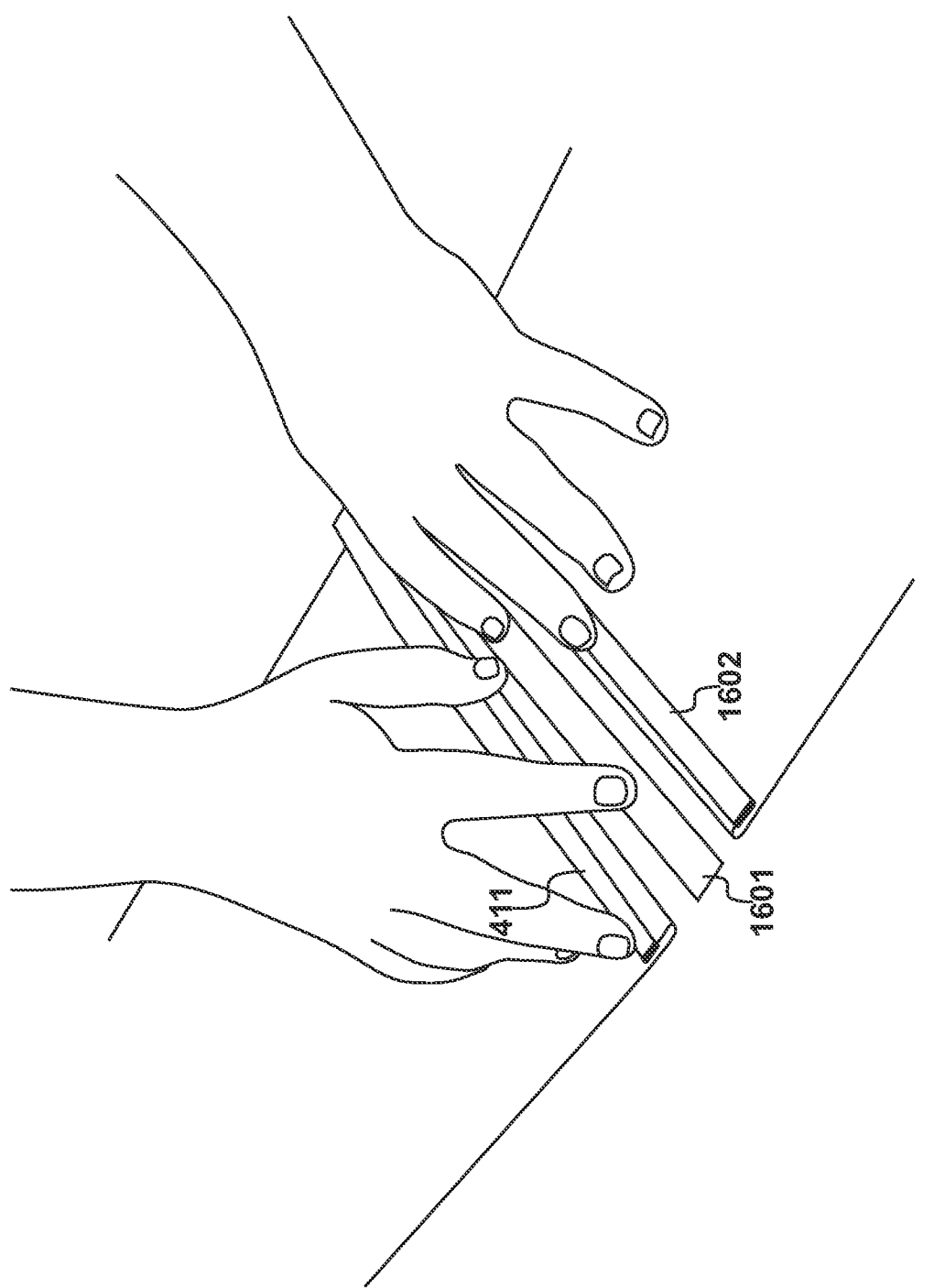
FIG. 16 shows the deployment of a single strip of hooked material.
Figure 17:
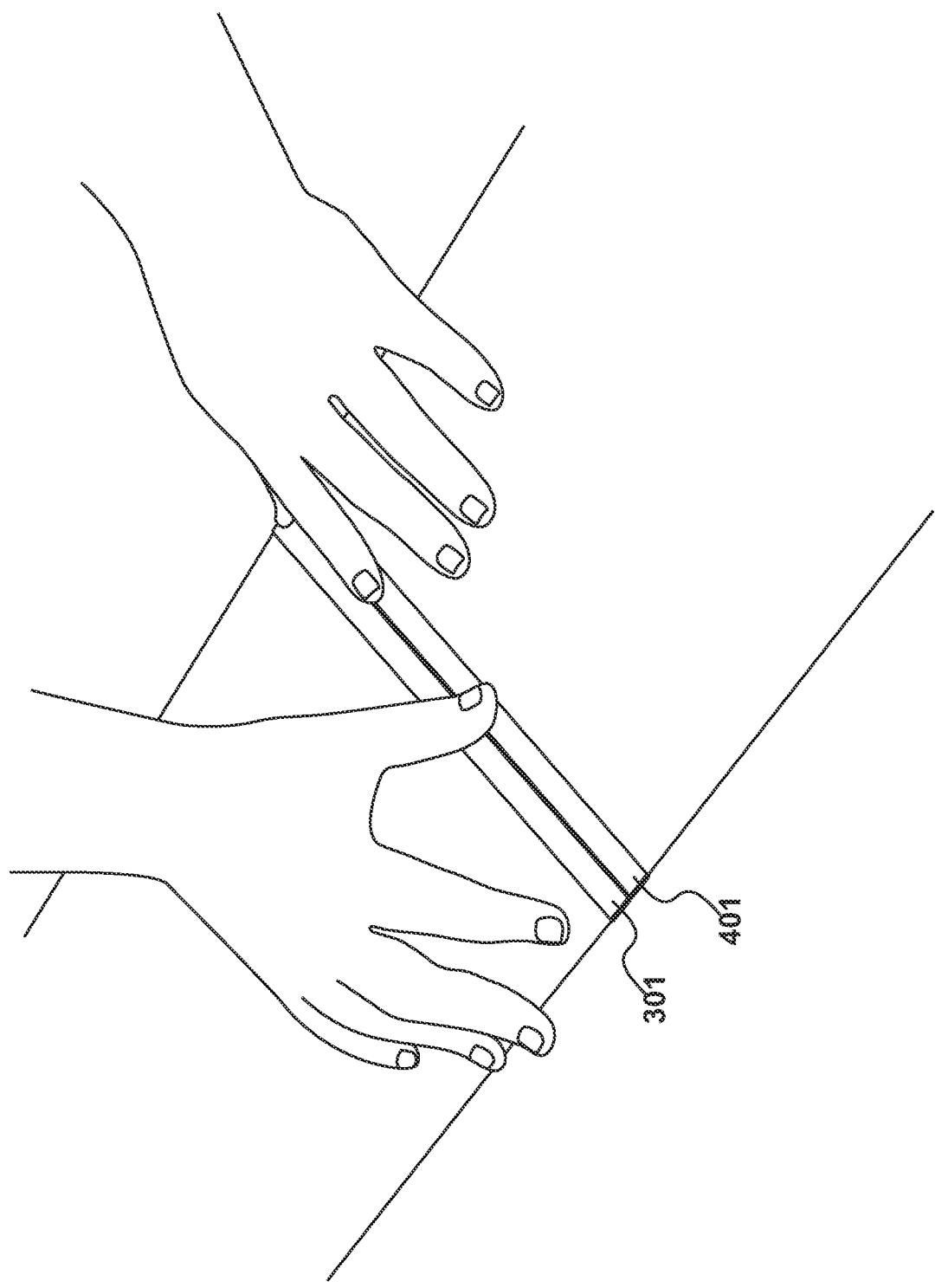
FIG. 17 shows the application of force after the plush material has been brought together.

Having deployed the single strip of hooked material 1601 behind the first rear surface and the second rear surface, as described with reference to FIG. 16, the edge of the first plush material strip 301 and the edge of the second plush material strip 401 are brought substantially into contact. Thereafter, force is applied to engage the hooks of the hooked material 1601 with the first rear surface 411 and the second rear surface 1602.

FIG. 18

Figure 18:
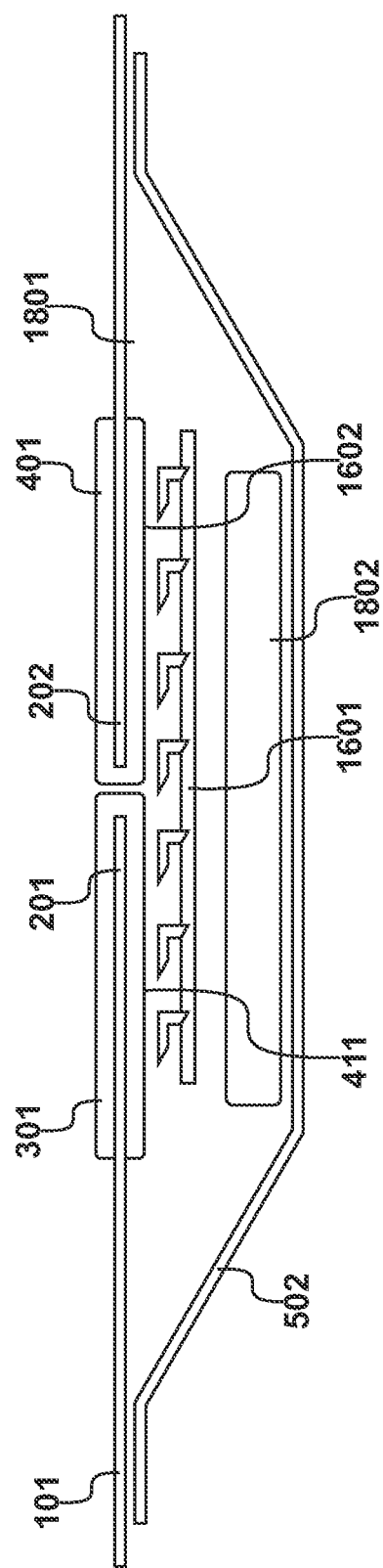
FIG. 18 shows a schematic representation of the apparatus.

A schematic representation of an apparatus for forming a seam, in accordance with an aspect of the present invention, is illustrated in FIG. 18. Following the method previously described, the apparatus is provided with a first plush material strip 301 and a second plush material strip 401. The apparatus is also provided with a signal strip of a hooked material 1601. The first plush material strip 301 is configured to surround the first fabric edge 201 and the second plush material strip 401 is configured to surround the second fabric edge 202. The edges are brought into an adjacent configuration as illustrated in FIG. 18. Furthermore, the single strip of hooked material 1601 is configured to be deployed beneath the rear faces (the first rear surface 411 and the second rear surface 1602) of the first plush material strip 301 and the second plush material strip 401.

In this embodiment, the assembly, which may be part of an item of clothing, includes the internal fabric 101 and an external fabric 502. This in turn creates a protected channel 1801 within which a component 1802, such as that described with reference to FIGS. 5 to 15, may be restrained. However, although the seam is secure, it is also accessible, thereby facilitating the repair or replacement of the restrained component 1802.

The invention claimed is:

1. A method of forming a seam connecting fabric edges, comprising the steps of:
   supporting a light-emitting device on a substrate;
   connecting power cables to said substrate;
   cutting an inner layer of a clothing fabric to create a first fabric edge and a second fabric edge;
   applying an adhesive film to an inside surface of an outer layer of said clothing fabric;
   creating a hole through said adhesive film and said clothing fabric at an intended position for said light-emitting device;
   positioning a central portion of a clear plastics material over said hole to define a window, such that said central portion is secured by said adhesive film, a first flap extends from a first side of said central portion and a second flap extends from a second side of said central portion;
   locating said light-emitting device at a position of said window;
   folding said first flap over said substrate;
   further-folding said second flap over said folded first flap;
   attaching said further folded second flap to said folded first flap to define a sealed enclosure for said substrate;

surrounding said first fabric edge with a first plush material strip suitable for attachment of a hooked material, wherein said first plush material strip defines a first front surface and a first rear surface;

surrounding said second fabric edge with a second plush material strip, wherein said second plush material strip defines a second front surface and a second rear surface;

deploying a single strip of said hooked material behind said first rear surface and said second rear surface; and with said first surrounded edge substantially in contact with said second surrounded edge, applying force to engage hooks of said single strip of said hooked material with said first rear surface and said second rear surface to connect said first fabric edge and said second fabric edge and thereby cover said light-emitting device.

2. The method of claim 1, wherein said cutting step reveals said inside surface of said outer layer of said clothing fabric.

3. The method of claim 1, wherein plural light-emitting devices are supported by said substrate.

4. The method of claim 3, further comprising the step of connecting a data cable to said substrate.

5. The method of claim 1, wherein said clear plastics material is clear poly-vinyl-chloride.

6. The method of claim 1, wherein said creating step includes twist-cutting said hole.

7. The method of claim 1, wherein:
said adhesive film comprises:
a central barrier film;
a first-adhesive layer on an outer surface of said adhesive film; and
a second-adhesive layer on an inner surface of said adhesive film.

8. The method of claim 7, wherein said applying step includes the steps of:
removing a first-backing material from said first-adhesive layer;
locating said first-adhesive layer upon said inside surface of said clothing fabric; and
applying heat and pressures to a second-backing material attached to said second-adhesive layer.

9. The method of claim 8, further comprising the step of removing said second-backing material prior to said positioning step.

10. The method of claim 9, further comprising the step of arranging a protective layer behind said substrate prior to said folding step.

11. The method of claim 1, further comprising the step of positioning a gasket around said light-emitting device prior to said locating step.

12. The method of claim 1, further comprising the steps of:
deploying an adhesive tape over an outer surface of said first flap after said folding step; and
securing an inner surface of said second flap to said adhesive tape after said further-folding step.

13. The method of claim 1, wherein said applying step applies said adhesive film at a position of a reflective tape.

* * * * *